United States Patent
Florczak et al.

(10) Patent No.: US 7,055,670 B2
(45) Date of Patent: Jun. 6, 2006

(54) SORTING APPARATUS

(75) Inventors: Werner Florczak, Schemmerhofen (DE); Sandra Amann, Laupheim (DE); Markus Habdank, Laupheim (DE); Norbert Damaschke, Dettingen (DE); Markus Weber, Biberach (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 212 days.

(21) Appl. No.: 10/937,571

(22) Filed: Sep. 9, 2004

(65) Prior Publication Data

US 2005/0061617 A1  Mar. 24, 2005

(51) Int. Cl.
*B65G 47/24*     (2006.01)

(52) U.S. Cl. .................. 198/406; 198/408; 198/443; 198/446; 198/450; 198/752.1

(58) Field of Classification Search ............... 198/443, 198/446, 450, 452, 453, 406, 408, 397.03, 198/752.1, 758, 433
See application file for complete search history.

(56) References Cited

U.S. PATENT DOCUMENTS

| | | | |
|---|---|---|---|
| 4,107,903 A | | 8/1978 | Wickersheim |
| 4,199,049 A | * | 4/1980 | Vamvakas ............... 198/408 |
| 4,213,526 A | * | 7/1980 | Graham et al. ............. 198/408 |
| 5,310,300 A | * | 5/1994 | Crabb et al. ............... 198/408 |
| 5,653,328 A | | 8/1997 | Pedrotto |
| 6,279,723 B1 | * | 8/2001 | Zinno ....................... 198/406 |
| 6,415,903 B1 | * | 7/2002 | Zinno et al. ............... 198/408 |

FOREIGN PATENT DOCUMENTS

| | | |
|---|---|---|
| DE | 1 004 103 | 3/1957 |
| DE | 1561979 | 10/1970 |
| DE | 2 156 218 | 5/1973 |
| DE | 3409225 | 9/1985 |
| DE | 10110339 | 10/2002 |
| FR | 2160229 | 5/1973 |

\* cited by examiner

*Primary Examiner*—James R. Bidwell
(74) *Attorney, Agent, or Firm*—Herbert Dubno; Andrew Wilford

(57) ABSTRACT

An apparatus for sorting identical flat-bottomed objects has a vibratory conveyor defining a generally horizontal support surface. A plurality of the objects are supplied to an upstream end of the surface standing on their flat bottoms and the objects travel along the surface while standing on their bottoms. A sorting drum rotatable about a horizontal axis at a downstream end of the conveyor is formed with at least one row of radially outwardly open seats generally complementary to the objects and each having a flat floor. The drum is rotated between a pickup position in which the flat floors of the one row of seats are aligned and generally coplanar with the support surface and closely juxtaposed with the downstream end and a handoff position with the one row of seats raised up above the support surface. The objects are taken out of the seats in the takeoff position.

10 Claims, 3 Drawing Sheets

SORTING APPARATUS

FIELD OF THE INVENTION

The present invention relates to a sorting apparatus. More particularly this invention concerns a sorter for small bottles, ampules, or the like.

BACKGROUND OF THE INVENTION

It is necessary to sort objects such as bottles, ampules, carpules, syringes, or the like from each other for packaging or treatment. They must be handled delicately, and must be oriented identically when they leave the sorting apparatus. Furthermore it is essential that the apparatus be able to do the required sorting without jamming up and thus leaving the downstream packaging/treatment machine with no supplies.

In German patent document 2,156,218 of O. Betz the bottles are delivered horizontally to a sorting drum having a multiplicity of radially open seats. The bottles are slid end-wise into the seats and the drum is rotated to transfer them into an upright condition on an output conveyor. This system has the disadvantage that the bottles must be meticulously fed bottom-first to the sorting drum so that any leakage will be certain to foul the conveyor or input device. Furthermore the outgoing bottles are grouped together in a manner that often requires further sorting before they are packaged or treated further.

Another device described in U.S. Pat. No. 5,653,328 of G. Pedrotto has a multiple chute arrangement that receives objects, here candies, from a conveyor belt and orders them into parallel rows, from which they are picked by a drum having seats that in theory handle only one candy at time. Such an arrangement is quite effective for this type of workpiece, but cannot be used for a more delicate bottle whose orientation is critical.

German patent document 1,004,103 of W. Sindzinski describes another sorting device that first separates the objects, once again a foodstuff, into rows, then picks the objects one at a time from the rows. Here the device is extremely long and the orientation of the object being sorted is not significant, so this system is not applicable to, for example, bottles.

OBJECTS OF THE INVENTION

It is therefore an object of the present invention to provide an improved sorting apparatus.

Another object is the provision of such an improved sorting apparatus which overcomes the above-given disadvantages, that is which can sort a mass of delicate flat-bottomed objects, for example bottles, into neatly ordered groups with the objects perfectly oriented relative to one another.

A further object is to provide such a sorting apparatus that ensures that takes up a relatively small floor space.

Yet another object is the provision of an improved sorting device that maintains the bottles upright through most of the sorting process so any leakage or loose caps will not foul the apparatus.

SUMMARY OF THE INVENTION

An apparatus for sorting identical objects each having a flat bottom and a predetermined diameter has according to the invention a vibratory conveyor defining a generally horizontal and planar support surface extending in a transport direction from an upstream end to a downstream end. A plurality of the objects are supplied to the upstream end standing on their flat bottoms so that the objects travel along the surface while standing on their bottoms toward the downstream end. A sorting drum rotatable about a horizontal axis at the downstream end is formed with at least one row of radially outwardly open seats generally complementary to the objects and each having a flat floor. Each seat has a maximum radial depth equal at most to the diameter. The drum is rotated between a pickup position in which the flat floors of the one row of seats are aligned and generally coplanar with the support surface and closely juxtaposed with the downstream end and a handoff position with the one row of seats raised up above the support surface. The objects are taken out of the seats in the takeoff position.

Thus the bottles are standing on their bottoms until actually picked off the conveyor by the sorting drum. Thus any problem with loose caps or leakage will not foul all of the bottles and the conveyor, but will instead be limited to the region of the sorting drum. What is more, the vibratory conveyor provides very gentle handling of the bottles so that breakage is largely avoided.

According to the invention the seats each have a generally cylindrical side wall generally perpendicular to the respective floor. Thus the complementary cylindrical bottles are smoothly and gently cradled as they are picked off the conveyor surface.

The drum in accordance with the invention is formed with a predetermined number of the rows of seats angularly equispaced about the axis. The drive steps the drum through an angle equal generally to 360° divided by the predetermined number. In a system with four rows of seats, the drive is stepped through 90° increments.

The takeoff means is above the drum and according to the invention a sorting comb defines on the conveyor surface a plurality of slots extending in the transport direction and each aligned radially with a respective one of the seats. Each slot has a length in the transport direction equal to at least three times the diameter, preferably about five times the diameter. Thus there is a sufficient bank of bottles in the slot to ensure that all the sorting-drum seats will be filled on each pick. Each slot has a width measured transverse to the direction and equal to slightly more than the diameter.

Furthermore according to the invention there is a jam-clearing element displaceable transversely of the comb at an upstream end of the comb and means for reciprocating the element transversely of the comb and thereby clearing any jams on the surface upstream of the comb. Thus if bottles get caught and jam up at the upstream end of the slots, the clearing element will push the jam out of the way. Since each slot preferably holds five of the objects, the jam-clearing element need only sweep back and forth at a relative slow rate, once for every four or five steps of the sorting drum to ensure that none of the slots gets empty.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
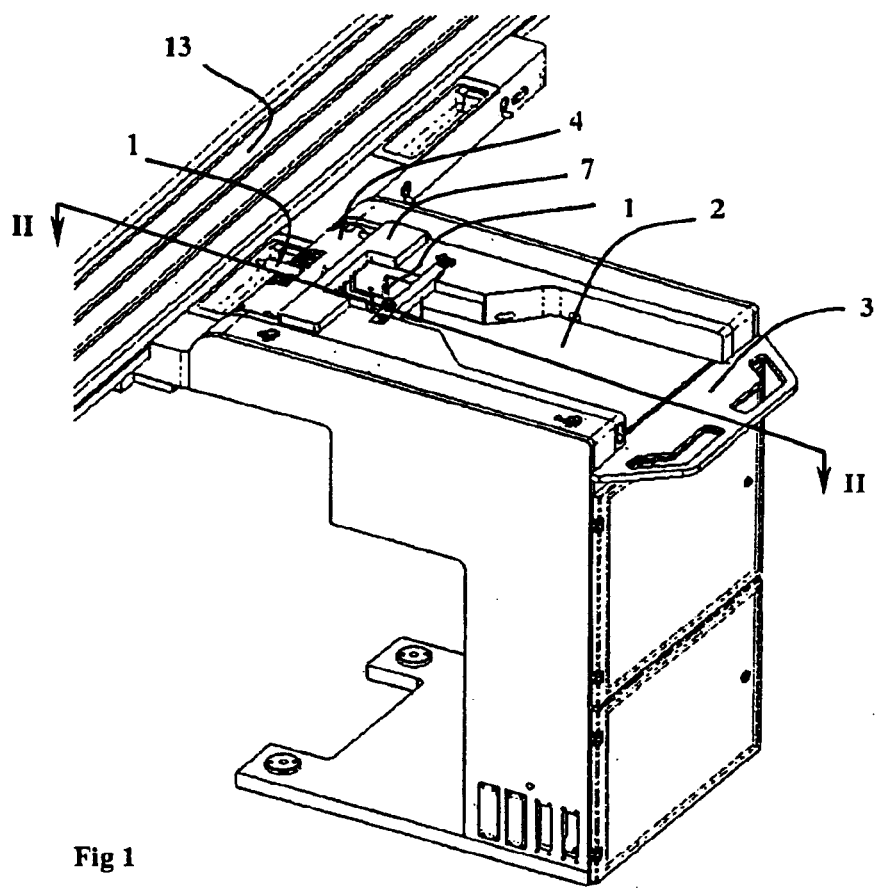
FIG. 1 is a perspective view of the sorting apparatus according to the invention.
Figure 2:
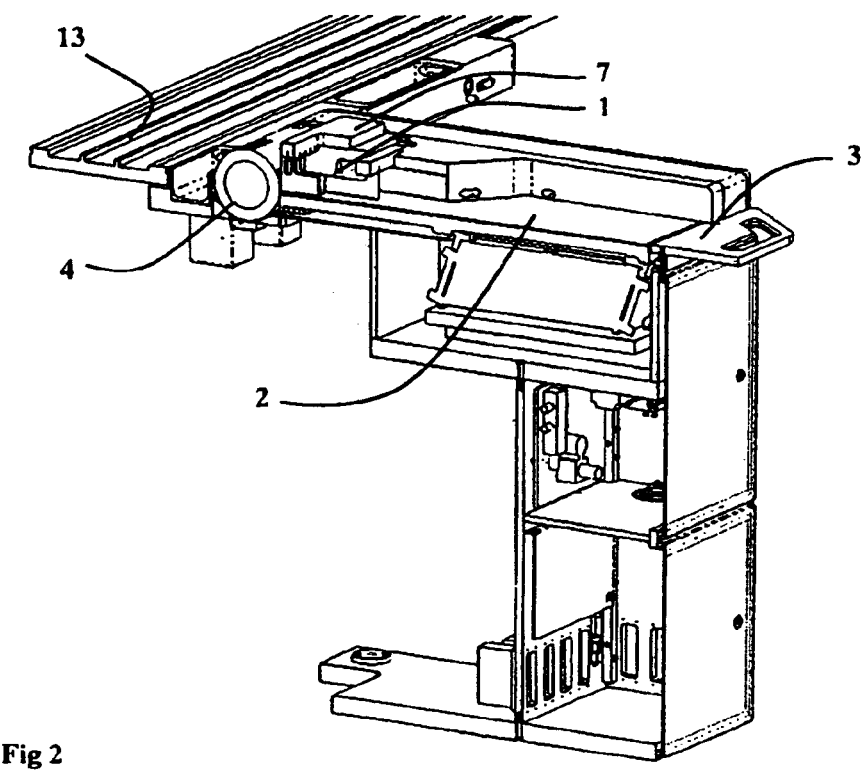
FIG. 2 is a vertical section taken along plane II—II of FIG. 1.
Figure 4:
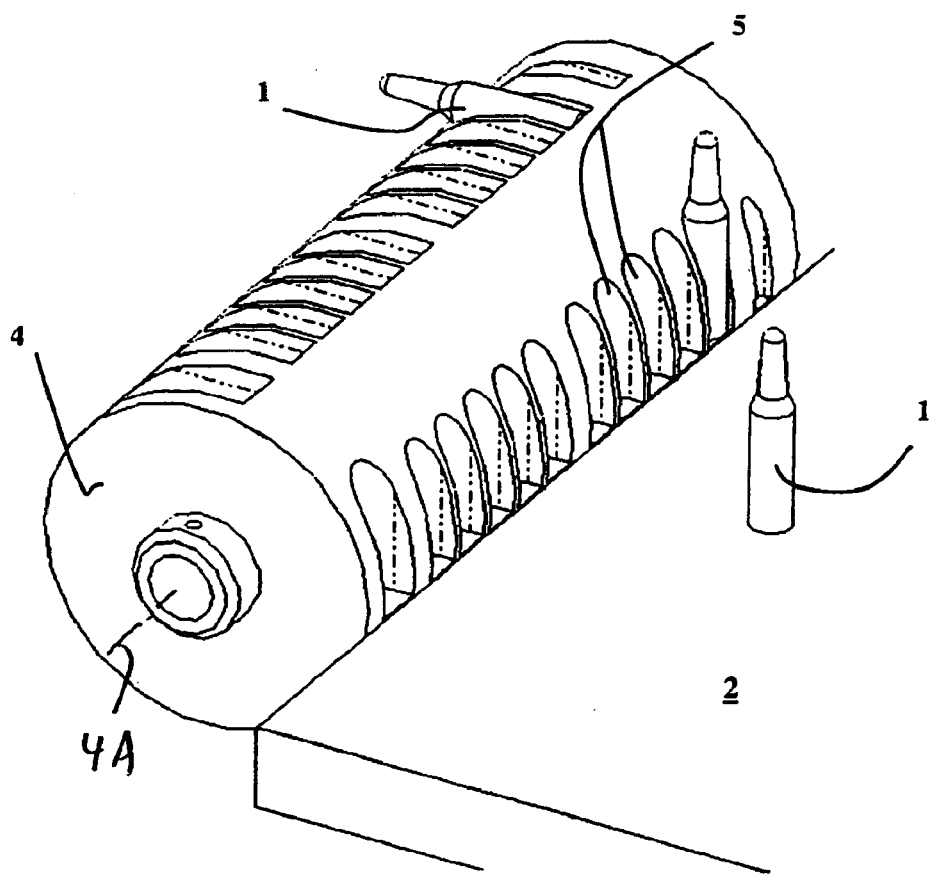
FIG. 4 is a perspective view of the detail shown in FIG. 3.
Figure 3:
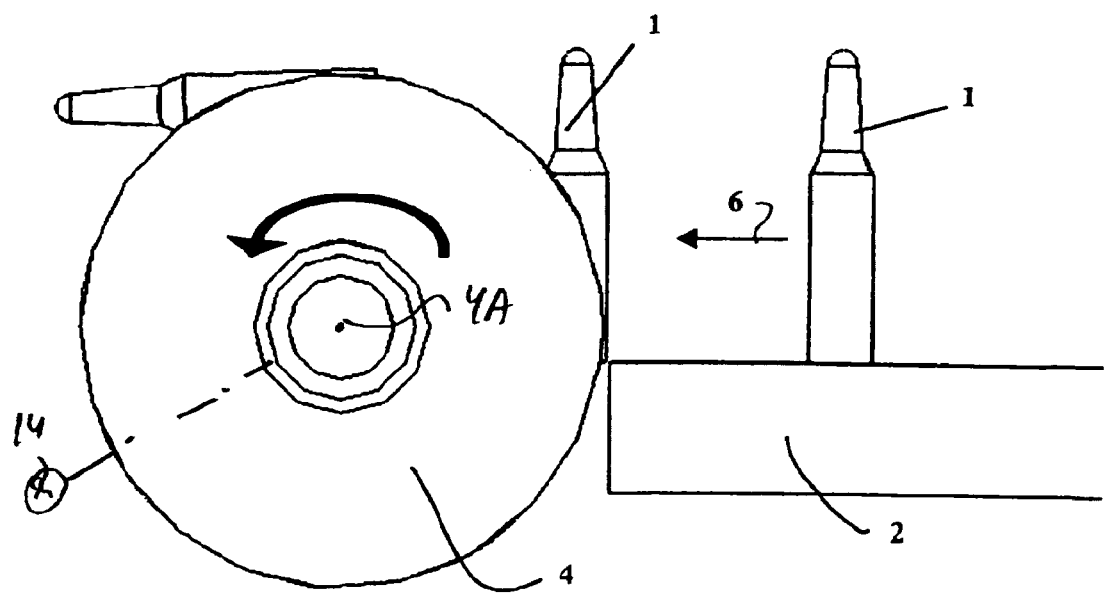
FIG. 3 is a partly schematic end view of a detail of the apparatus.
Figure 6:
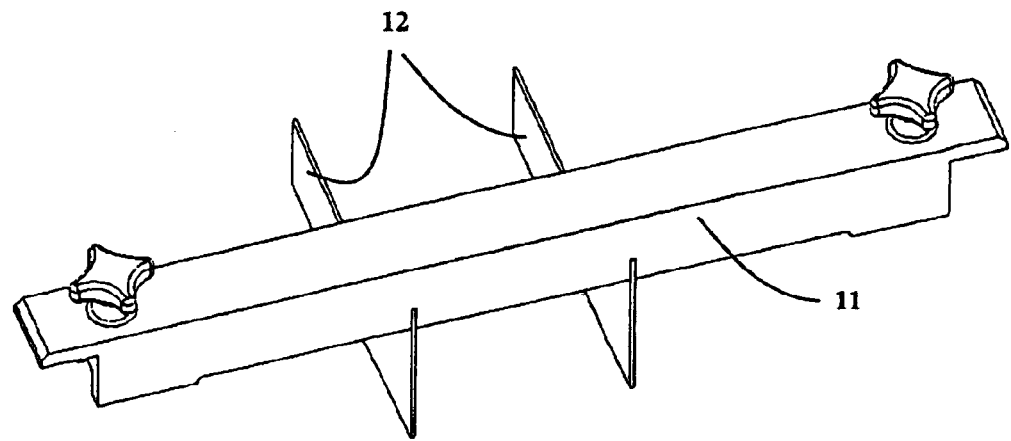
FIG. 6 is a large-scale view of a detail of the structure shown in FIG. 5.
Figure 5:
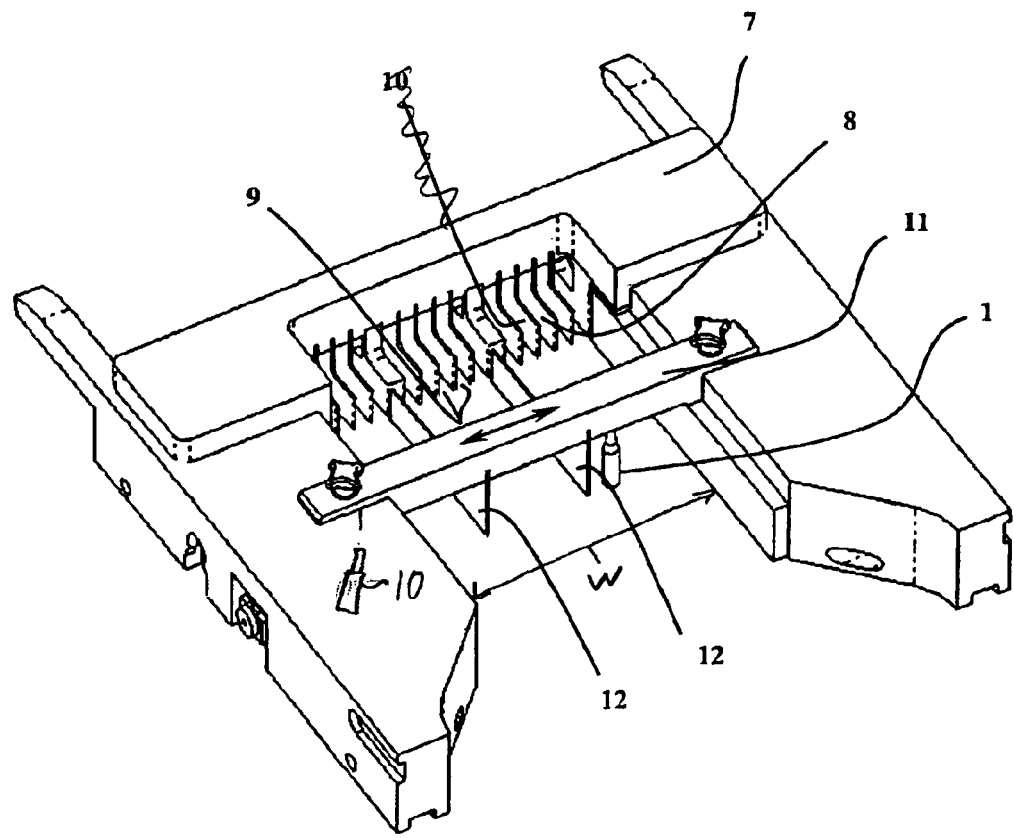
FIG. 5 is a perspective view of another detail of the apparatus.

As seen in FIGS. 1 and 2, a sorting apparatus according to the invention is intended to work with objects 1, here small liquid-containing cylindrical bottles having flat bottoms and of the type used as ampules or carpules for medical purposes. The apparatus has a standard vibratory conveyor 2 constituted as a generally horizontal plate whose planar upper support surface is pitched slightly downward in a horizontal transport direction 6 so that bottles 1 standing on it will move in the direction 6 from an input plate 3 at the slightly raised upstream end of the conveyor 2.

At a downstream end of the conveyor 2 is a sorting drum 4 centered on and rotatable about a horizontal axis 4A parallel to a downstream edge of the conveyor 2, and in fact is generally in the same plane as the upper face of the conveyor 2. This drum 4 is formed with four rows of axially equispaced identical seats 5 dimensioned to complementarily hold the bottles 1, here each having a part-cylindrical side wall extending tangentially of the axis 4A and a planar floor extending radially of the axis 4A. A motor 14 steps the drum 4 in 90° increments through positions in each of which the floors of one of the rows of seats 5 is coplanar with the conveyor plate 2. The drum 4 is spaced very close to the downstream edge of the conveyor 2 so that the bottles 1 can slide smoothly off the support surface of the conveyor 2 into the seats 5, that is any gap between the drum 4 and the conveyor 2 has a width that is a small fraction of the diameter of the bottles 1.

Immediately upstream in the direction 6 from the sorting drum 4 is a comb comprised of a horizontal upper support bar 7 and a row of plate-like teeth 8 defining a row of slots 9 extending in the direction 6 underneath the bar 7. The plates 8 are L-shaped and lie in respective vertical planes at a spacing equal to the axial spacing between the seats 5 of each row on the drum 4. The length in the direction 6 of each of the slots 9 is equal to about five times the diameter of the bottles 1 so that during normal operation each slot 9 will hold five of the bottles 1.

In order to prevent jams at the upstream side of the comb 7, 8, there is a transversely movable bar 11 carrying a pair of plates 12. The plates 12 lie in vertical planes and are spaced apart by a distance equal to about one-third of a width W of the conveyor 2. A pneumatic actuator or drive 10 can reciprocate the bar 11 and its plates 12 through a distance equal to about one-third of the conveyor width W so that the plates 12 sweep back and forth immediately upstream of the upstream ends of the comb plates 8. Thus if the bottles 1 have formed a jam blocking the upstream end of one of the slots 9, the passing plate 12 will clear this jam. Thus the bar 11 and plates 12 need only be reciprocated slowly to maintain a sufficient stock of bottles 1 in the slots 9.

A pick-and-place device including a table 13 is provided for taking the bottles 1 off the slots in the takeoff position they are in when oriented horizontally at the top of the drum 4.

We claim:

1. An apparatus for sorting identical objects each having a flat bottom and a predetermined diameter, the apparatus comprising:
    a vibratory conveyor defining a generally horizontal and planar support surface extending in a transport direction from an upstream end to a downstream end;
    means for supplying a plurality of the objects to the upstream end standing on their flat bottoms so that the objects travel along the surface while standing on their bottoms toward the downstream end;
    a drum rotatable about a horizontal axis at the downstream end and formed with at least one row of seats generally complementary to the objects and each having a flat floor, each seat having a maximum radial depth equal at most to the diameter;
    means for rotating the drum between a pickup position in which the flat floors of the one row of seats are aligned and generally coplanar with the support surface and closely juxtaposed with the downstream end and a handoff position with the one row of seats raised up above the support surface; and
    means for taking the objects out of the seats in the takeoff position.

2. The sorting apparatus defined in claim 1 wherein in the seats each have a generally cylindrical side wall generally perpendicular to the respective floor.

3. The sorting apparatus defined in claim 1 wherein the drum is formed with a predetermined number of the rows of seats angularly equispaced about the axis, the rotating means stepping the drum through an angle equal generally to 360° divided by the predetermined number.

4. The sorting apparatus defined in claim 1 wherein the takeoff means is above the drum.

5. The sorting apparatus defined in claim 1, further comprising
    a sorting comb defining on the conveyor surface a plurality of slots extending in the transport direction and each aligned radially with a respective one of the seats.

6. The sorting apparatus defined in claim 5 wherein each slot has a length in the transport direction equal to at least three times the diameter.

7. The sorting apparatus defined in claim 6 wherein the length is equal to at least about five times the diameter.

8. The sorting apparatus defined in claim 5 wherein each slot has a width measured transverse to the direction and equal to slightly more than the diameter.

9. The sorting apparatus defined in claim 5, further comprising
    a jam-clearing element displaceable transversely of the comb at an upstream end of the comb; and
    means for reciprocating the element transversely of the comb and thereby clearing any jams on the surface upstream of the comb.

10. The sorting apparatus defined in claim 9 wherein the reciprocating means is a pneumatic actuator.

* * * * *